(12) United States Patent
Kirchoff et al.

(10) Patent No.: US 11,852,765 B1
(45) Date of Patent: Dec. 26, 2023

(54) HYDROPHONE MODULE

(71) Applicant: The United States of America as represented by the Secretary of the Navy, Newport, RI (US)

(72) Inventors: Eric H Kirchoff, Newport, RI (US); Michael J Kroger, Middletown, RI (US)

(73) Assignee: The Government of the United States of America as represented by the Secretary of the Navy

( * ) Notice: Subject to any disclaimer, the term of this patent is extended or adjusted under 35 U.S.C. 154(b) by 0 days.

(21) Appl. No.: 17/900,941

(22) Filed: Sep. 1, 2022

Related U.S. Application Data

(62) Division of application No. 17/015,144, filed on Sep. 9, 2020, now Pat. No. 11,745,835.

(51) Int. Cl.
| | |
|---|---|
| *G01V 1/38* | (2006.01) |
| *B63B 21/66* | (2006.01) |
| *G01V 1/18* | (2006.01) |
| *G01V 1/20* | (2006.01) |
| *B63B 73/00* | (2020.01) |

(52) U.S. Cl.
CPC .............. *G01V 1/186* (2013.01); *B63B 21/66* (2013.01); *G01V 1/202* (2013.01); *G01V 1/3843* (2013.01); *B63B 73/00* (2020.01)

(58) Field of Classification Search
CPC ........ B63B 21/66; G01V 1/186; G01V 1/202; G01V 1/3843
See application file for complete search history.

(56) References Cited

U.S. PATENT DOCUMENTS

| | | | | |
|---|---|---|---|---|
| 4,346,954 A | * | 8/1982 | Appling ................. | G01V 1/201 439/204 |
| 4,696,540 A | * | 9/1987 | Adams ................. | G02B 6/3878 385/75 |
| 4,756,595 A | * | 7/1988 | Braun ................... | G02B 6/4428 385/75 |
| 4,801,277 A | * | 1/1989 | Seilhan ................. | H01R 13/64 439/597 |
| 4,880,390 A | * | 11/1989 | Brackmann, Jr. .... | H01R 13/523 439/204 |
| 5,046,055 A | * | 9/1991 | Ruffa ..................... | G10K 11/16 174/101.5 |
| 5,873,750 A | * | 2/1999 | Cairns ................... | H01R 13/523 439/587 |

(Continued)

*Primary Examiner* — Ian J Lobo
(74) *Attorney, Agent, or Firm* — James M. Kasischke; Michael P. Stanley; Jeffry C. Severson

(57) ABSTRACT

An assembly with a first coupling having a forward bulkhead device is provided. The forward bulkhead device contains a first connector insert having first end connections for wires and optical fibers of an acoustic array. The assembly also includes a second coupling having an aft bulkhead device therein. The aft bulkhead device contains a second connector insert having second end connections for the wires and optical fibers of the acoustic array. The forward bulkhead device further includes an alignment assembly. The alignment assembly is matable with the aft bulkhead device to align the first connector insert with the second connector insert. The forward bulkhead device further includes a locking ring connecting the forward bulkhead device with the aft bulkhead device.

3 Claims, 11 Drawing Sheets

(56) References Cited

U.S. PATENT DOCUMENTS

| | | | | |
|---|---|---|---|---|
| 6,870,997 B2* | 3/2005 | Cooke | ................ | G02B 6/4454 |
| | | | | 385/135 |
| 8,757,892 B1* | 6/2014 | Allen | ................ | G02B 6/3878 |
| | | | | 385/59 |
| 9,843,180 B2* | 12/2017 | Aue | ................ | H01R 13/20 |
| 2003/0016916 A1* | 1/2003 | Allen | ................ | G02B 6/3816 |
| | | | | 385/55 |
| 2005/0117857 A1* | 6/2005 | Cooke | ................ | G02B 6/4428 |
| | | | | 385/100 |

* cited by examiner

HYDROPHONE MODULE

The present application is a divisional non-provisional application which claims the benefit of previously-filed U.S. patent application Ser. No. 17/015,144 filed on Sep. 9, 2020 and entitled "Thin Line Towed Array Bootable Bulkhead" by the inventors Eric H. Kirchoff and Michael J. Kroger.

STATEMENT OF GOVERNMENT INTEREST

The invention described herein may be manufactured and used by or for the Government of the United States of America for any governmental purpose without payment of any royalties thereon or therefor.

BACKGROUND OF THE INVENTION (1) Field of the Invention

The present invention is directed to towed array modules and more particularly, to bootable bulkhead assemblies for joining modular arrays.

(2) Description of the Prior Art

Arrays of hydrophones are towed for sensing sound below the surface of the ocean. Typically, such arrays are linear assemblies of modules with each module having sections that have a bulkhead at opposing ends.

Hydrophones are mounted in the sections. Sound pressure waves in the ocean pass through the wall of various sections where the hydrophones sense the pressure fluctuations and transform the sensed pressures into electrical signals which are transmitted back to a support vessel.

Submarines can deploy a thin-line towed-array (TLTA) using mechanical handling systems. Each module of the thin-line array includes an outer sheath or hose that contains the hydrophones and supporting electronics. However, TLTAs have historically had poor reliability. One of the reasons for this poor reliability is the mechanical stress on the electrical and optical data paths during booting of the array module.

Booting is the process of pulling a pre-hose assembly into the hose to create the final module assembly. The pre-hose assembly includes electrical and optical harnesses, telemetry units, internal strength members and other components that constitute functional elements along with strength members to carry tension across each array module.

To pull the pre-hose assembly into the hose of the TLTA module, the hose is inflated beyond a nominal, non-pressurized inner diameter in order to reduce friction between the pre-hose assembly and the inside wall of the hose.

Typically, bulkheads at the end of each module are too large to fit through the ends of the hose; therefore, each end of the pre-hose assembly is terminated with a coupling. However, one end of the pre-hose assembly may be constructed without the wires and optical fibers terminated into the connector insert and coupling. This end is pulled into the hose first and to the other end of the hose until the terminated end of the pre-hose assembly is seated in the coupling.

Once the first end of the pre-hose assembly is seated in the coupling; the other end of the pre-hose assembly is terminated in the connector insert and bulkhead. In order to make this happen, an excess length of wire and fiber is needed free from the hose to terminate the second end. As a result, the pre-hose assembly is longer than the hose.

The hose is then elongated over the pre-hose assembly until the other end of the unseated bulkhead is seated in the coupling. Occasionally, final sections of the pre-hose assembly are reinserted into the hose by hand. In either case, the wires and fibers in the excess pre-hose assembly may wrinkle and fold inside the hose; thereby, subjecting the wires and fibers to stresses that contribute to poor reliability.

SUMMARY OF THE INVENTION

Devices and methods described herein allow for the booting of a thin line towed array with connector inserts prepopulated inside a bulkhead. Wires and fibers are pre-terminated in the connector insert and bulkhead before the booting process. This pre-termination eliminates the need to pull excess pre-hose material through the hose.

It is anticipated that the pre-hose can be shortened in relation to the hose such that both bulkheads can be seated at the same time; thereby, reducing wire and fiber stresses introduced through excess lengths and pulling back into the hose. Since some frictional buildup will remain between the pre-hose assembly and the hose walls; excess length may be required to account for hose stretch caused by induced tension from the friction. Furthermore, the TLTA bulkhead enables a booting process that reduces stress on the electrical and optical data paths in the array.

The TLTA bulkhead disclosed herein is novel in the capability to be booted with the optical and electrical connectors already terminated in the connector inserts and the connector insert installed in the bulkhead. This reduces the amount of pre-hose assembly, or towed array internals, which must be pulled past the booting process. This also reduces the excess pre-hose length requirement and improves towed array reliability by reducing stresses on the optical and electrical components and wiring.

According to another aspect of the invention, an assembly has a first coupling having a forward bulkhead device therein. The forward bulkhead device contains a first connector insert having first end connections for wires and optical fibers of an acoustic array. The assembly also includes a second coupling having an aft bulkhead device therein. The aft bulkhead device contains a second connector insert having second end connections for the wires and optical fibers of the acoustic array.

The forward bulkhead device further includes an alignment assembly. The alignment assembly is matable with the aft bulkhead device to align the first connector insert with the second connector insert. The forward bulkhead device includes a locking ring to connect with the aft bulkhead device.

According to an exemplary hydrophone assembly herein, a housing tube comprises an elongated sleeve having a first end and a second end. A pre-tube assembly is located inside the housing tube. The pre-tube assembly includes a plurality of hydrophones, and a harness connected to the hydrophones.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
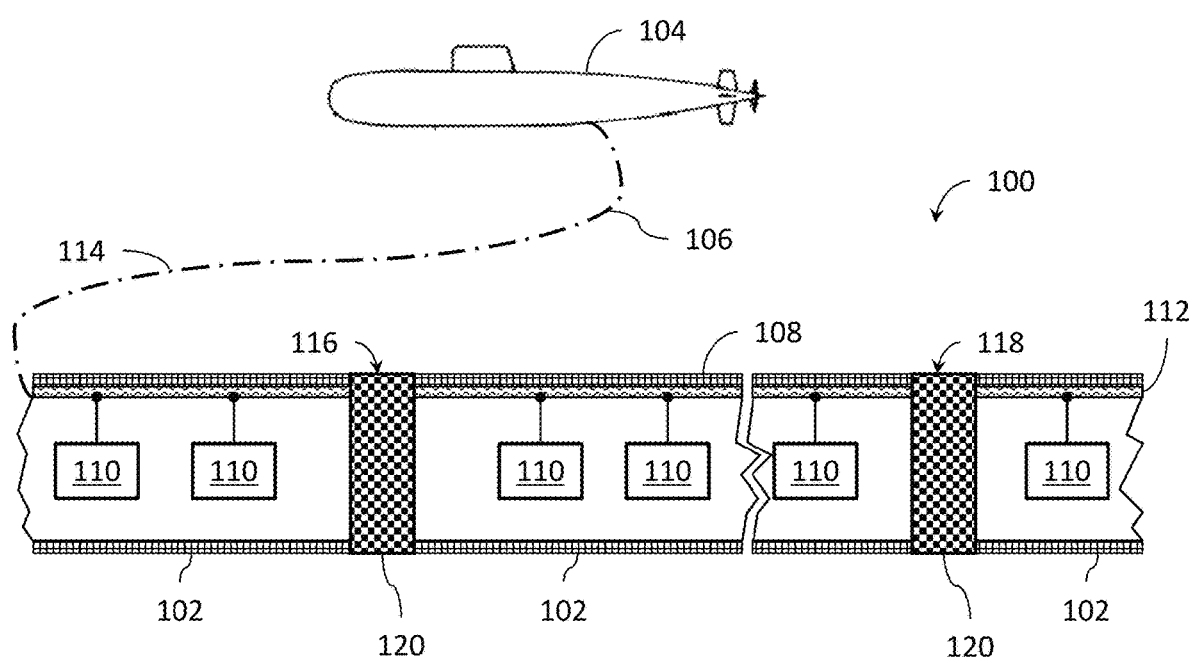
FIG. 1 is a sectional view of a towed array system of the present invention.

Referring to the drawings, FIG. 1 shows a towed array 100. The towed array 100 contains a linear series of modules 102 in which the modules couple together. The array 100 is towed from a vessel 104, such as a surface ship or a submarine, using a cable 106.

Each of the modules 102 has a housing formed by a flexible hose 108. The flexible hose 108 may be made from an elastomer or plastic and may be reinforced, such as with Kevlarm fibers or other suitable fibers. For a thin-line towed array, the hose section for each module 102 will typically be one and one-half inch or less in diameter and have a length of 30 to 250 feet. The relative dimensions of the modules 102 are distorted in FIG. 1 for illustration purposes.

Hydrophones 110 are disposed in each of the modules 102. A plurality of modules 102 may be coupled together to form the array 100. The hydrophones 110 communicate via a harness 112 inside the flexible hose 108, which is connected to a transmission line 114 inside the cable 106.

Sound pressure waves in the ocean pass through the wall of various modules 102 where the hydrophones 110 sense the pressure fluctuations and transform the sensed pressures into signals that are transmitted via the cable 106 back to the vessel 104. The transmission line 114 may be an electric and/or optical conduit for relaying signals from the array 100 via the harness 112 to the vessel 104. The signals are then processed to provide a representation of the underwater sound.

The flexible hose 108 for each module has a first end 116 and a second end 118, referred to herein as the forward end (corresponding to 116) and the aft end (corresponding to 118). Typically, the ends of the modules 102 are sealed at each of opposing ends by a connector 120. The connector 120 is constructed of two halves, which will be described in detail below.

The connector 120, referred to herein as the Bootable Bulkhead includes forward and aft couplings and forward and aft bulkheads. The harness 112 can be attached to the bulkheads. The connectors 120 permit mating of adjacent modules 102 and allow the signals from the hydrophones 110 to pass therethrough as if the harness 112 were continuous.

As mentioned above, each module 102 for a towed array 100 is formed by pulling a pre-hose assembly into the flexible hose 108 to create a final assembly. The pre-hose assembly comprises the hydrophones, electrical and/or optical harnesses, telemetry units and other components that constitute the functional elements of each module 102. To pull the pre-hose assembly into the flexible hose 108; the flexible hose is inflated beyond a non-pressurized inner diameter. Typically, bulkheads at the end of each module 102 are too large to fit through the ends of the flexible hose 108; therefore, each end of the pre-hose assembly is terminated with a coupling.

However, one end of the pre-hose assembly may be constructed without the wires and optical fibers terminated into the connector insert and coupling. This end is pulled into the flexible hose 108 first and through to the other end of the flexible hose until the terminated end of the pre-hose assembly is seated in the coupling.

Once the first end of the pre-hose assembly is seated in the coupling; the other end of the pre-hose assembly is terminated in the connector insert and bulkhead. In order to make this happen, some excess length of wire and fiber is needed free from the flexible hose 108 to terminate the second end. The flexible hose 108 is then elongated over the pre-hose assembly until the other end of the unseated bulkhead is seated in the coupling.

Figure 2:
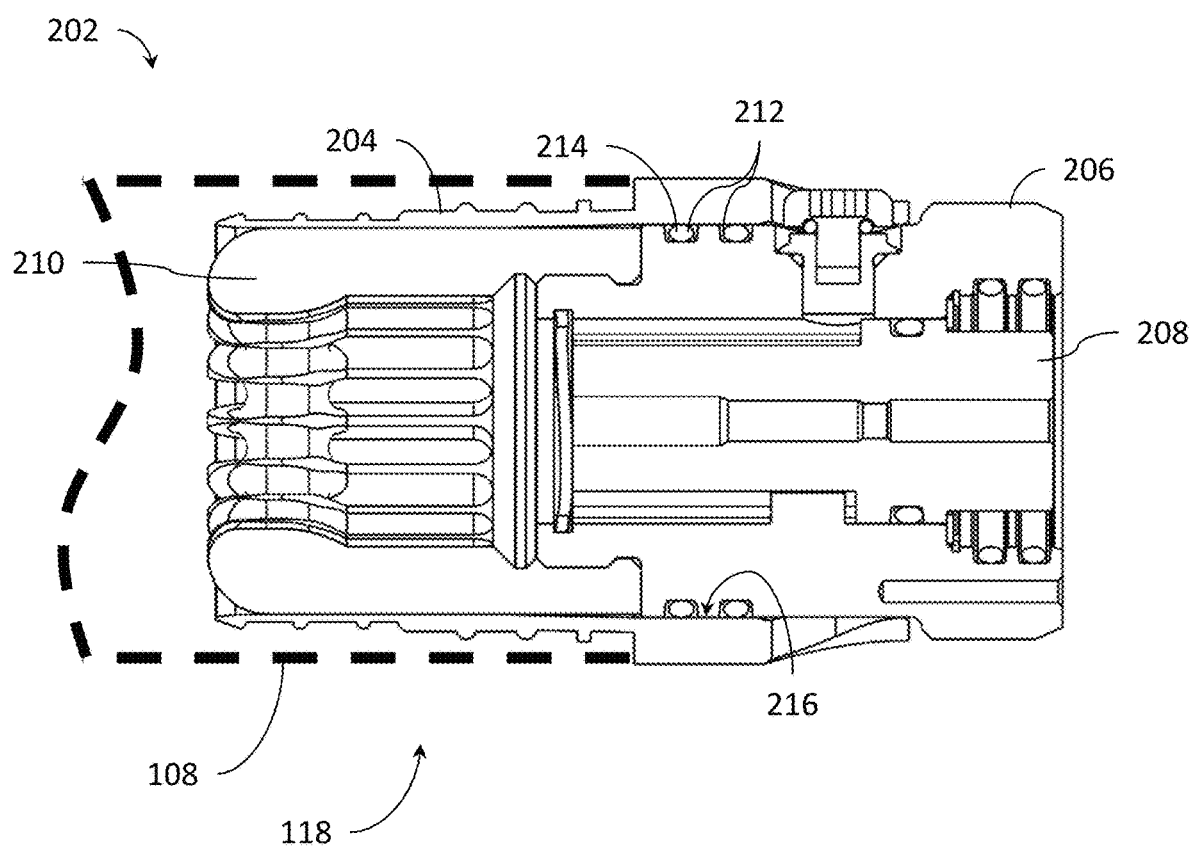
FIG. 2 is a cross section view of an aft bulkhead assembly of the present invention.

As mentioned above, the connector 120 is constructed of two halves, the aft bulkhead assembly and the forward bulkhead assembly, which reside on the aft and forward ends of each array module 102, respectively. FIG. 2 shows a section view of an aft bulkhead assembly 202. The aft bulkhead assembly 202 includes an aft coupling 204, an aft bulkhead device 206, an aft connector insert 208, and a female clevis 210.

The aft connector insert 208 is housed within the aft bulkhead device 206. By design, the aft bulkhead assembly 202 is not bootable, and therefore cannot be pulled through the aft coupling 204 or the flexible hose 108. The aft bulkhead assembly 202 is assembled prior to booting of the module 102.

While the aft bulkhead assembly 202 comprises three main components, various hardware components, such as O-ring grooves 212 in the aft bulkhead device 206, along with the one or more O-rings 214 may be provided to seal the aft bulkhead device against a mating surface 216 on the aft coupling 204. The aft end of the wires and optical fibers (not shown) of the harness 112 terminate in the aft connector insert 208. The aft end of the internal strength members (not shown) for the module 102 terminate to the female clevis 210. Once seated in the aft coupling 204, the aft bulkhead assembly 202 is held in place using radial screws (not shown) or other fasteners.

Figure 3:
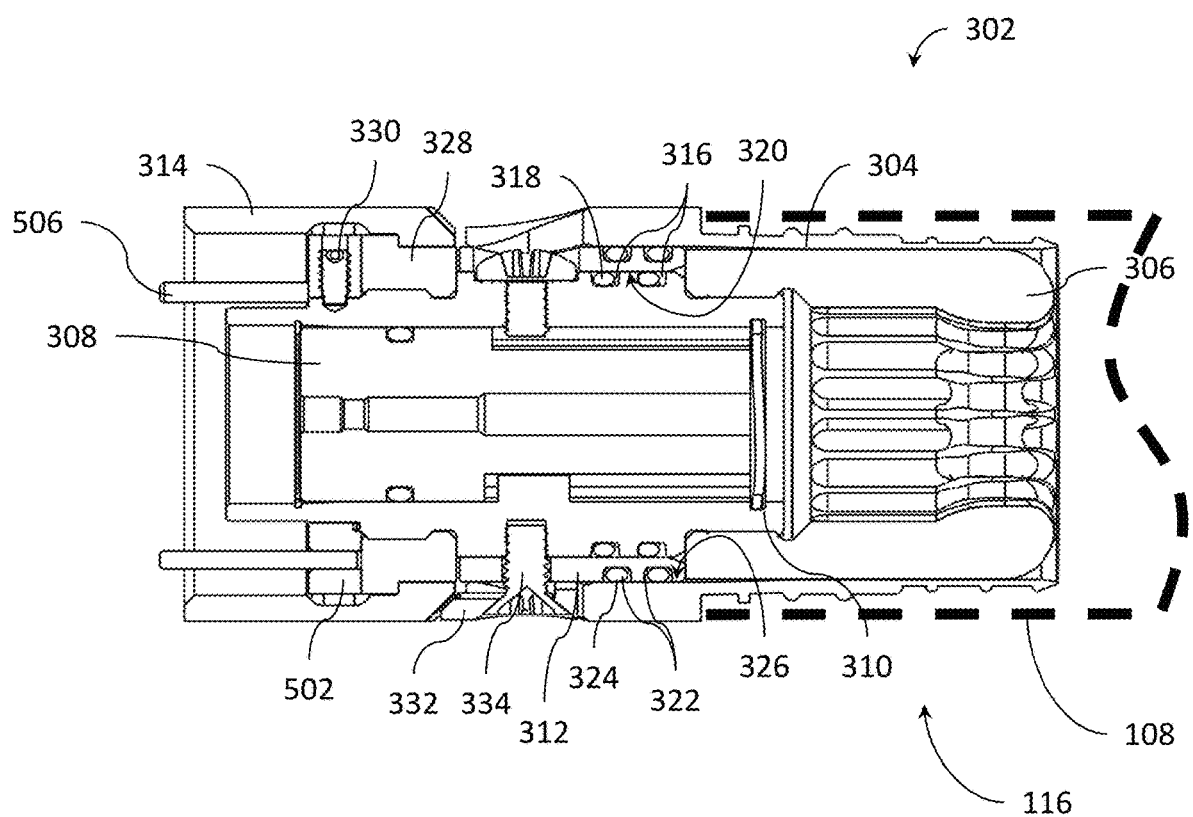
FIG. 3 is a cross section view of a forward bulkhead assembly of the present invention.

FIG. 3 shows a section view of a forward bulkhead assembly 302. The forward bulkhead assembly 302 includes a forward coupling 304, a female clevis 306, a forward connector insert 308, and a forward bulkhead device 310. The forward connector insert 308 is housed within the forward bulkhead device 310. In a mirror view to the aft bulkhead assembly 202, the forward end of the wires and optical fibers (not shown) of the harness 112 terminate in the forward connector insert 308 and the forward end of the internal strength members (not shown) for the module 102 terminate to the female clevis 306.

The outer diameter of the forward bulkhead device 310 is smaller than the inner diameter of the forward coupling 304. Given that the outer diameter of the forward bulkhead device 310 is smaller than the inner diameter of the forward coupling 304; the forward bulkhead device 310 can be booted through the forward coupling 304 and the flexible hose 108 when the flexible hose is inflated.

The forward bulkhead assembly 302 can be pulled clear of the flexible hose 108. Since the wires and optical fibers have been terminated in the forward connector insert 308 and the forward connector insert is contained in the forward bulkhead device 310; the pre-hose assembly does not need to be pulled far out of the flexible hose 108.

The forward bulkhead assembly 302 also includes a sealing sleeve 312 that can be pushed over the outside of the forward bulkhead device 310 after the sleeve has been pulled through the flexible hose 108. A locking ring 314 is slid over the sealing sleeve 312 and screwed onto the forward bulkhead device 310. The locking ring 314 has standard threads to mate with the aft bulkhead assembly 202.

The sealing sleeve 312 is inserted around the forward bulkhead device 310 to seal the bulkhead to environmental conditions. The sealing sleeve 312 also acts as a centering ring to allow the forward bulkhead device 310 to remain centered in the forward bulkhead assembly 302.

The forward bulkhead assembly 302 may also include hardware components, such as O-ring grooves 316 in the forward bulkhead device 310, along with the one or more O-rings 318 provided to seal the forward bulkhead device 310 against a mating surface 320 on the sealing sleeve 312. In addition, other O-ring grooves 322 in the sealing sleeve 312, along with the one or more O-rings 324 may be provided to seal the sealing sleeve 312 against a mating surface 326 on the forward coupling 304.

Each module 102 includes a forward bulkhead assembly 302 on the first end 116 and an aft bulkhead assembly 202 on the second end 118. The array 100 is constructed by attaching the first end 116 of a module 102 to the second end of another module 102.

Figure 4:
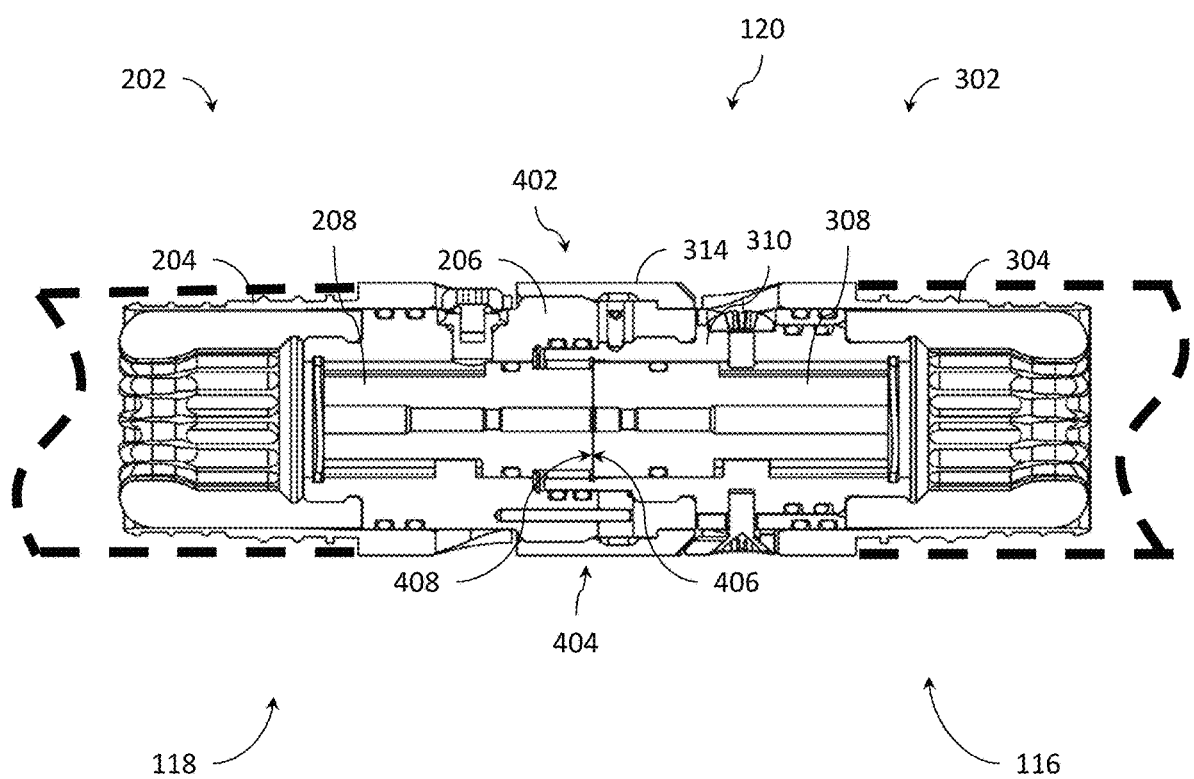
FIG. 4 is a cross section view of a bootable bulkhead of the present invention.

FIG. 4 shows the connector 120 (Bootable Bulkhead) with the aft bulkhead assembly 202 of a first module mated to the forward bulkhead assembly 302 of a second module. As shown in the figure, a portion 402 of the aft bulkhead device 206 fits within the locking ring 314 and a portion 404 of the aft connector insert 208 fits within the forward bulkhead device 310, such that a distal end 406 of the aft connector insert 208 abuts a distal end 408 of the forward connector insert 308 to form a mating junction.

Figure 5:
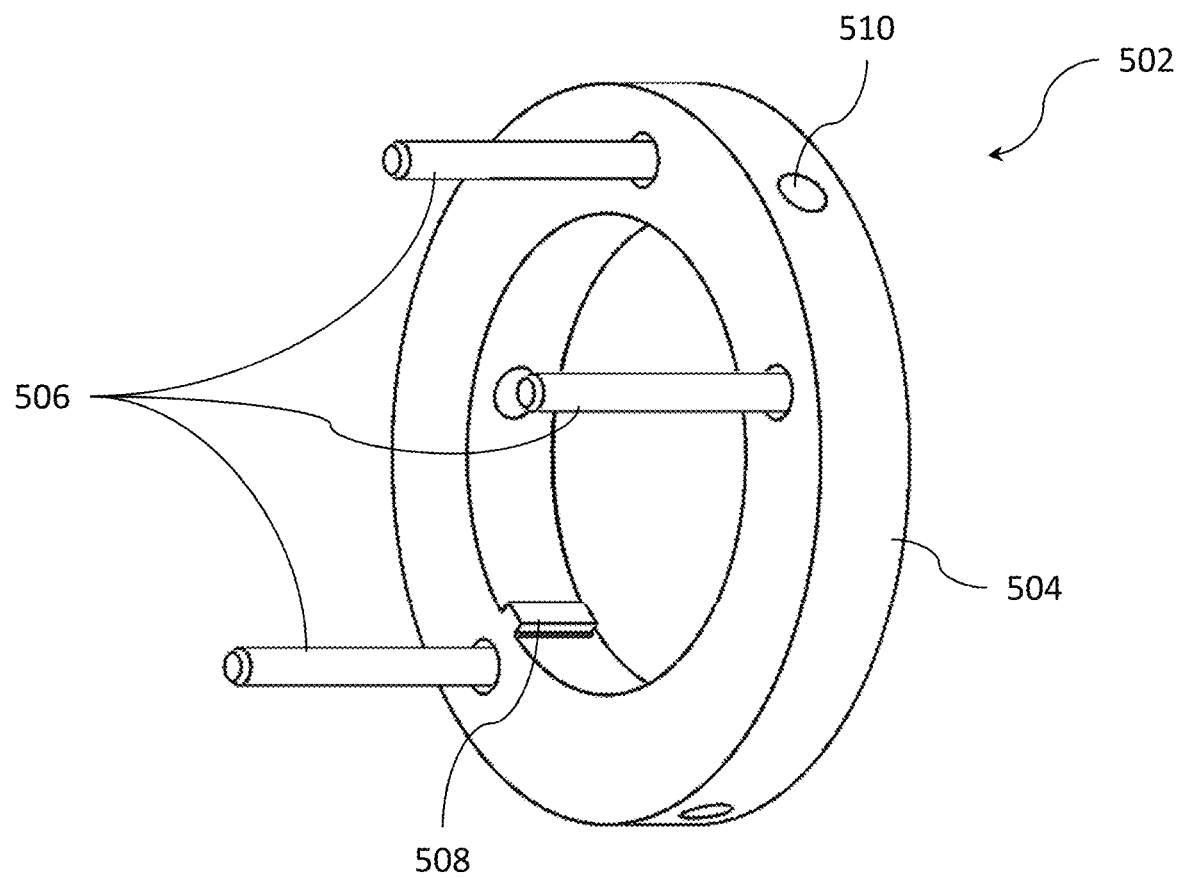
FIG. 5 is a perspective view of an alignment assembly of the present invention.

Referring again to FIG. 3, in order to ensure proper alignment of the forward bulkhead assembly 302 with the aft bulkhead assembly 202; the forward bulkhead assembly includes a retained shoulder 328 that is threaded onto the forward bulkhead device 310. The retained shoulder 328 provides a bearing surface for the locking ring 314 and an alignment assembly 502, such as shown in FIG. 5.

The alignment assembly 502 includes an alignment ring 504 with alignment pins 506 extending perpendicular to the alignment ring 504 and a notched key 508. The alignment assembly 502 preserves radial alignment between the modules 102. It is important to preserve radial alignment between the modules 102 in order to align fiber and electrical pins within the aft connector insert 208 and the forward connector insert 308.

A plurality of set screws 330 are used in the alignment assembly 502. The set screws 330 are installed through the locking ring 314 and apertures 510 in the alignment ring 504 to prevent the alignment assembly 502 from falling off during mating of the forward bulkhead assembly 302 with the aft bulkhead assembly 202. The set screws 330 also prevent the retained shoulder 328 from vibrating off and breaking the inter-module connection. Similarly, a locking tab 332 may be used to prevent the locking ring 314 from vibrating loose. The locking tab 332 overlaps a portion of the locking ring 314 and may be held in place by a fastener 334.

Figure 6A:
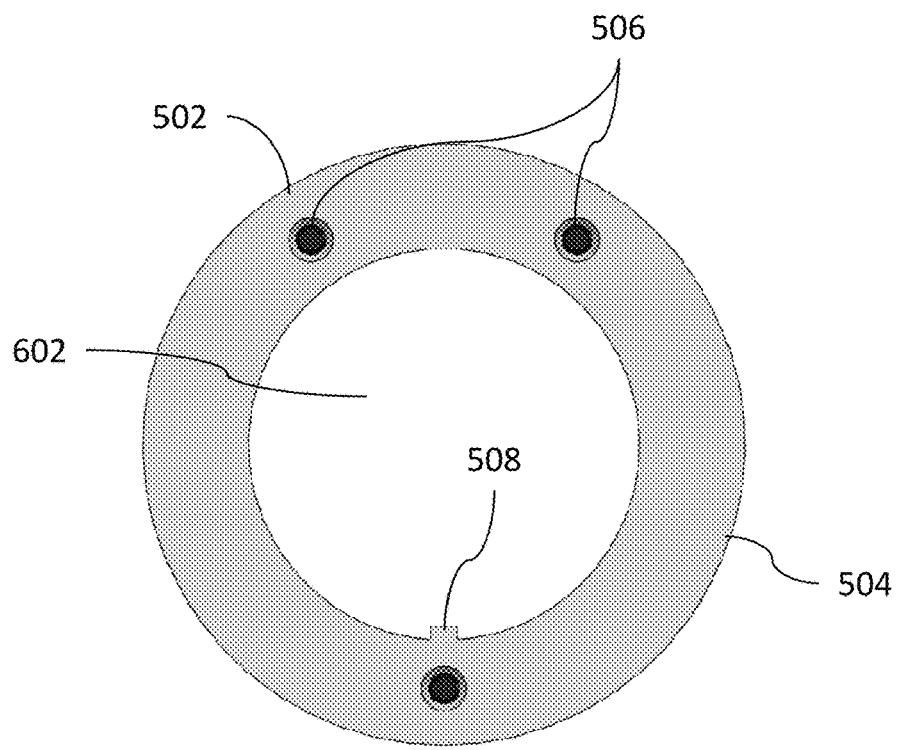
FIGS. 6A and FIG. 6B are end views of an alignment assembly and forward bulkhead device of the present invention.
Figure 6B:
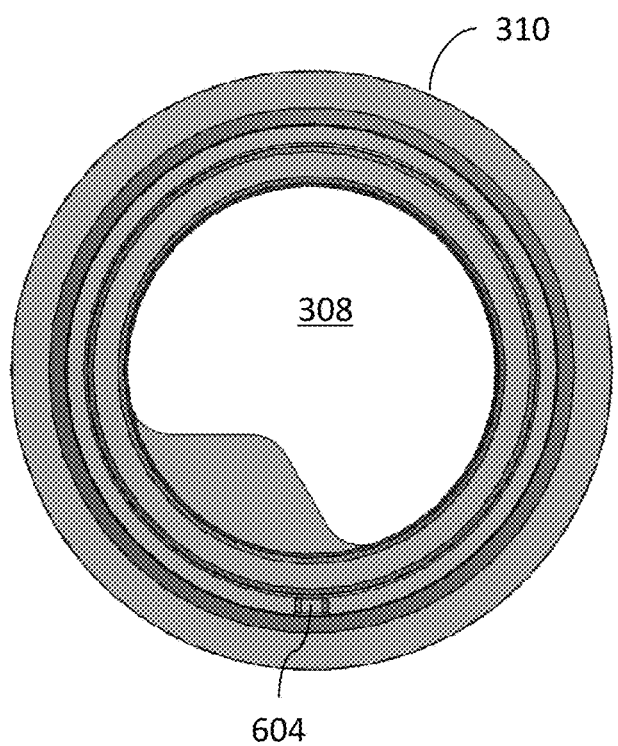
Figure 7:
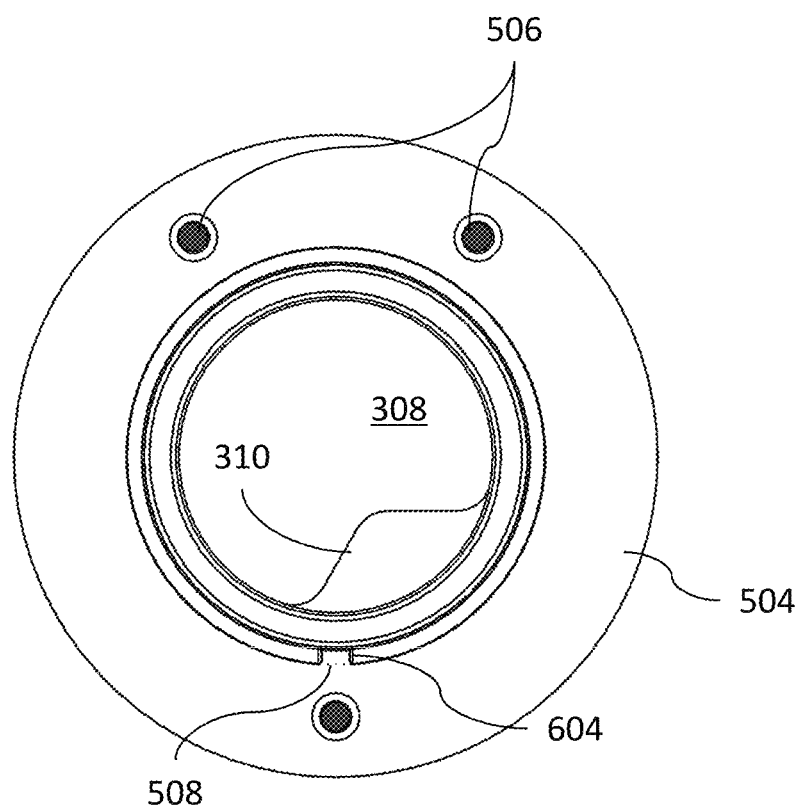
FIG. 7 shows an end view of the alignment piece on the aft bulkhead device of the present invention.

FIGS. 6A and FIG. 6B show end views of the alignment assembly 502 and the forward bulkhead device 310, respectively. The alignment ring 504 has a central opening 602 through which the forward bulkhead device 310 is located. This provides an opening so that the forward connector insert 308 can match up with the aft connector insert 208. The alignment assembly 502 is aligned to the forward bulkhead device 310 using the notched key 508 on the alignment assembly 502 and a keyway 604 on the forward bulkhead device 310. See FIG. 7.

Figure 8:
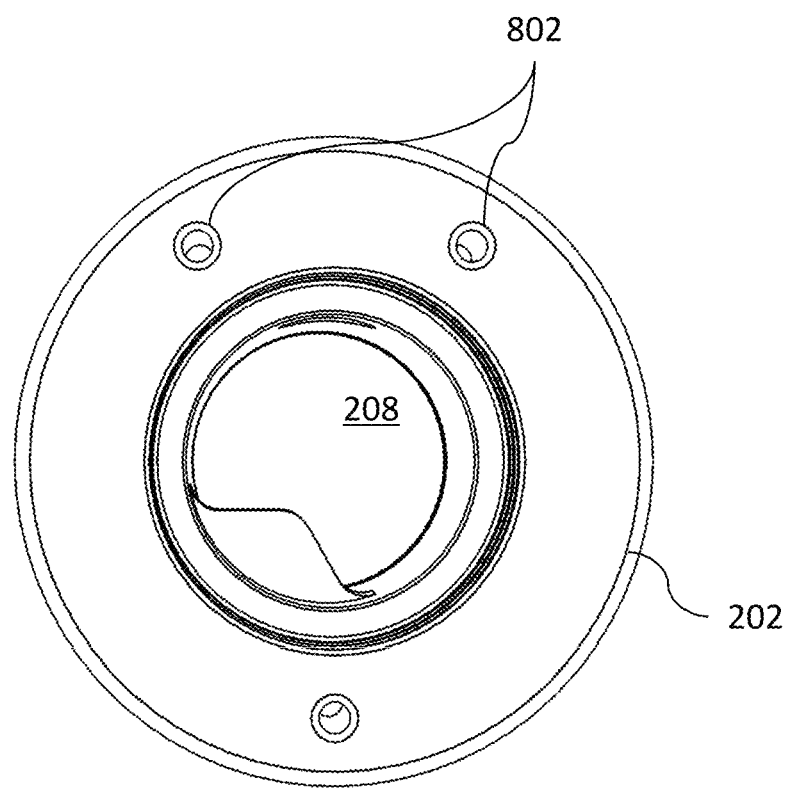
FIG. 8 is an end view of an aft bulkhead device of the present invention.

FIG. 8 shows an end view of the aft bulkhead device 206. The aft bulkhead device 206 has a plurality of alignment holes 802 that correspond to the alignment pins 506 on the alignment assembly 502. The alignment assembly 502 then aligns the aft bulkhead assembly 202 and the forward bulkhead assembly 302 through the alignment pins 506 that are in the alignment ring 504.

Referring again to FIG. 4, the aft bulkhead assembly 202 and the forward bulkhead assembly 302 mate together to form a completed connector 120 (Bootable Bulkhead). Through the mating of the aft bulkhead assembly 202 and the forward bulkhead assembly 302; the connector 120 preserves radial alignment between modules; passes tensile loads between modules; passes optical and electrical signals between modules; and provides an environmental seal at the mating junction. Because the aft bulkhead assembly 202 is not bootable, the forward bulkhead assembly 302 is pulled into the flexible hose 108 first.

Figure 9:
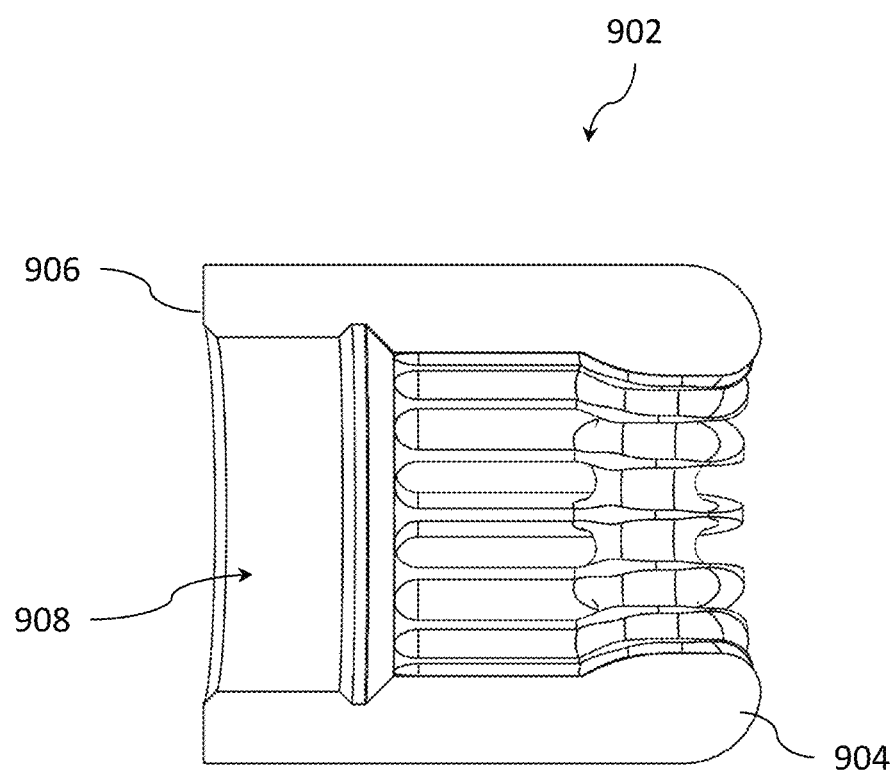
FIG. 9 is a cross section view of a female clevis of the present invention.

An additional feature of the present disclosure is the female clevis 210 and the female clevis 306 at the ends of the aft bulkhead assembly 202 and the forward bulkhead assembly 302, respectively. FIG. 9 shows an exemplary female clevis 902 having a load end 904 and a seating end 906. Female threads 908 may be located within the seating end 906. The female threads 908 are preferably standard Unified Series Threads (UST). The female threads 908 pass tensile loads while maintaining the geometry for booting the forward bulkhead assembly 302.

Figure 10:
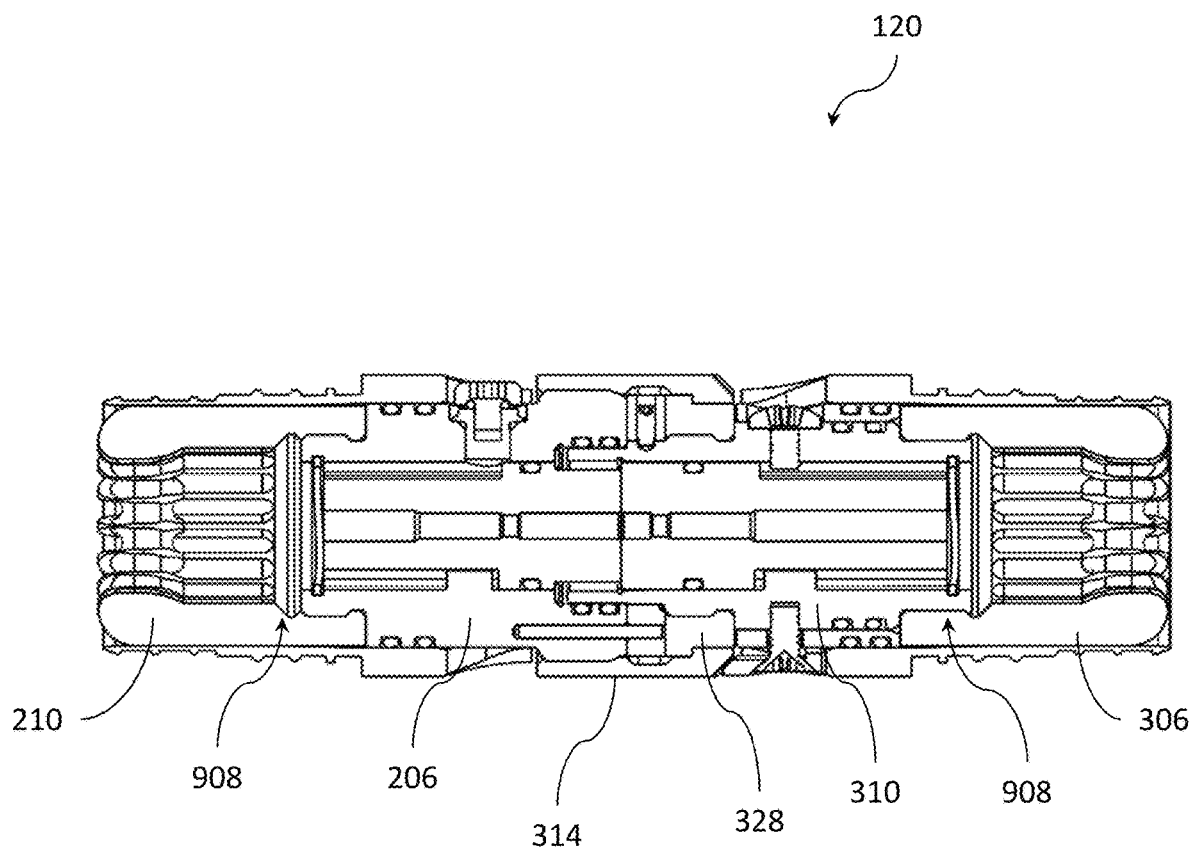
FIG. 10 illustrates the tensile load path across the bootable bulkhead.

FIG. 10 shows the tensile load path across the connector 120 (Bootable Bulkhead). Load is distributed radially, around the entire assembly. The tensile load path starts from the female clevis 210 on the aft bulkhead assembly 202. Referring to the depicted figures in totality, the female clevis 210 passes loads to the aft bulkhead device 206 through the female threads 908. The aft bulkhead device 206 subsequently passes the load to the locking ring 314 which bears on the retained shoulder 328. The retained shoulder 328 passes the load onto the forward bulkhead device 310.

Finally, the female clevis 306 on the forward end of the forward bulkhead assembly 302 takes the load. Both female clevises 210, 306 are connected to internal strength members in the flexible hose 108 to carry loads in the module 102 along with load sharing across the flexible hose 108.

Figure 11:
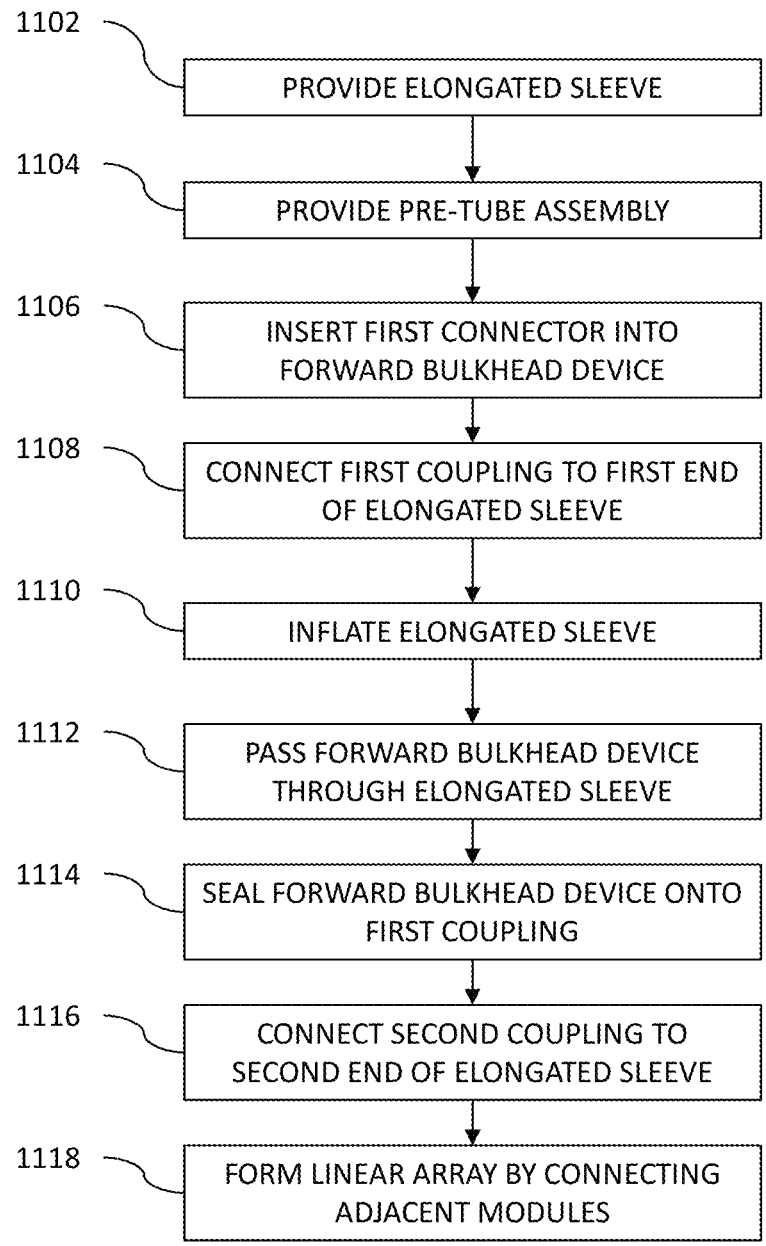
FIG. 11 is a flow chart illustrating methods herein.

FIG. 11 is a flow chart illustrating an exemplary method of assembling a towed hydrophone array module. At step 1102, an elongated sleeve having a first end and a second end is provided. The elongated sleeve may be a flexible tube made from an elastomer or plastic and may be reinforced, such as with Kevlar™ fibers or other suitable fibers. At step 1104, a pre-tube assembly is provided. The pre-tube assembly includes a plurality of hydrophones and a harness connected to the hydrophones. The harness has a first connector insert connected to a first end of the harness and a second connector insert connected to a second end of the harness.

At step 1106, the first connector insert is inserted into a forward bulkhead device. The forward bulkhead device is part of a forward bulkhead assembly, which also includes a first coupling. At step 1108, the first coupling is connected to the first end of the elongated sleeve. At step 1110, the elongated sleeve is inflated and the forward bulkhead device is passed through the elongated sleeve from the second end toward the first end, at step 1112. Responsive to the forward bulkhead device reaching the first end of the sleeve; the forward bulkhead device is sealed onto the first coupling, at step 1114. At step 1116, second coupling is connected to the second end of the elongated sleeve. The second coupling includes an aft bulkhead assembly. At step 1118, a linear array is formed by connecting the forward bulkhead assembly of one module to the aft bulkhead assembly of an adjacent module.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The invention has been described with references to specific embodiments. While particular values, relationships, materials, and steps have been set forth for purposes of describing concepts of the present disclosure, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein.

What is claimed is:

1. A hydrophone module comprising:
   a locking ring;
   a flexible hose;
   a housing tube as an elongated sleeve having a first end and a second end;
   a pre-tube assembly located in said housing tube, said pre-tube assembly including a plurality of hydrophones and a harness with a first end and a second end with a first connector insert connected to the first end of said harness and a second connector insert connected to the second end of said harness, said harness operationally connected to said plurality of hydrophones;
   a forward coupling sealing the first end of said elongated sleeve;
   a forward bulkhead device including o-ring grooves around a periphery to contain sealing o-rings and containing a first connector insert connected to the first end of said harness and capable of securing wiring as well as optical fibers and a female clevis capable of securing internal strength members therein and a sealing sleeve including o-ring grooves around a periphery of said sealing sleeve to contain sealing o-rings with said sealing sleeve capable of being pushed over an outside of said forward bulkhead device after said sealing sleeve has been pulled through said flexible hose and with said sealing sleeve capable of accommodating a locking ring wherein an outer diameter of said forward bulkhead device is smaller than an inner diameter of said first coupling;
   an aft coupling connected to and sealing the second end of said elongated sleeve with said aft coupling including an aft bulkhead device with a plurality of alignment holes and o-ring grooves around a periphery of said aft bulkhead device to contain sealing o-rings, an aft connector insert connected to the second end of said harness and capable of securing wiring as well as optical fibers and a female clevis capable of securing internal strength members therein;
   an alignment assembly including a notched key, said alignment assembly being mateable with said aft bulkhead device to align said forward connector insert with said aft connector insert on said notched key;
   a locking ring capable of connecting said forward bulkhead device with said aft bulkhead device; and
   a retained shoulder threaded onto said forward bulkhead device to ensure proper alignment of said forward bulkhead assembly with said aft bulkhead assembly and to provide a bearing surface for said locking ring and said alignment assembly;
   wherein said forward bulkhead device is capable of being booted through said forward coupling and said flexible hose when said flexible hose is inflated;
   wherein a portion of said aft bulkhead device is capable of being fitted within said locking ring and a portion of said aft connector insert is capable of fitting within said forward bulkhead device such that a distal end of said aft connector insert can form a mating junction at a distal end of a forward connector of another hydrophone module.

2. The hydrophone module according to claim 1, said alignment assembly further comprising:
   an alignment ring having a central opening so that said forward connector insert can match up with said aft connector insert and said alignment ring having a plurality of apertures with said alignment ring surrounding said first connector insert; and
   at least one alignment pin extending perpendicular to said alignment ring toward said aft bulkhead device such that said at least one alignment pin corresponds to the alignment holes of said aft bulkhead device thru said plurality of apertures.

3. The hydrophone module according to claim 2, wherein said aft bulkhead device includes at least one alignment hole corresponding to at least one alignment pin.

* * * * *